United States Patent
Ohira et al.

(10) Patent No.: US 12,061,528 B2
(45) Date of Patent: Aug. 13, 2024

(54) STORAGE SYSTEM AND STORAGE SYSTEM CONTROL METHOD

(71) Applicant: Hitachi, Ltd., Tokyo (JP)

(72) Inventors: Yoshinori Ohira, Tokyo (JP); Takahiro Yamamoto, Tokyo (JP); Hiroto Ebara, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 17/941,906

(22) Filed: Sep. 9, 2022

(65) Prior Publication Data

US 2023/0205650 A1    Jun. 29, 2023

(30) Foreign Application Priority Data

Dec. 27, 2021    (JP) ................. 2021-213045

(51) Int. Cl.
*G06F 11/14* (2006.01)
*G06F 11/16* (2006.01)

(52) U.S. Cl.
CPC ...... *G06F 11/1666* (2013.01); *G06F 2201/84* (2013.01)

(58) Field of Classification Search
CPC ............. G06F 11/1666; G06F 11/1008; G06F 11/1088; G06F 11/1092
USPC .............................. 714/6.21, 6.22, 6.23, 6.24
See application file for complete search history.

(56) References Cited

U.S. PATENT DOCUMENTS

| | | | |
|---|---|---|---|
| 2018/0101305 A1* | 4/2018 | Kazi | G06F 3/0604 |
| 2018/0196614 A1* | 7/2018 | Ivanov | G06F 11/1008 |
| 2018/0210785 A1* | 7/2018 | Olarig | G06F 11/1076 |
| 2018/0341549 A1* | 11/2018 | Bolkhovitin | G06F 11/1068 |
| 2021/0303178 A1 | 9/2021 | Ohira et al. | |
| 2023/0388180 A1* | 11/2023 | Ayyagari | H04L 41/22 |

FOREIGN PATENT DOCUMENTS

| | | | | |
|---|---|---|---|---|
| CN | 112764661 A | * | 5/2021 | .......... G06F 11/1092 |
| JP | 2021-157588 A | | 10/2021 | |
| WO | WO-2015011825 A1 | * | 1/2015 | .......... G06F 11/1076 |

* cited by examiner

*Primary Examiner* — Chae M Ko
(74) *Attorney, Agent, or Firm* — Procopio, Cory, Hargreaves & Savitch LLP

(57) ABSTRACT

A storage system includes one or more storage units, and a calculator. Each of the one or more storage units has plural physical storage devices, and a processor. The calculator has a controller that processes data inputted to and outputted from the storage unit by the processor. The storage system subjects the data to redundancy and stores the redundant data, and when a failure in which the data related to a read request cannot be read from one of the physical storage devices has occurred, reads the data from the readable physical storage device, recovers the data related to the read request, and transmits the recovered data to a request source of the read request. A process for recovering the data related to the read request from the read data can be selectively executed by the controller of the calculator and the processor of the storage unit.

9 Claims, 20 Drawing Sheets

DOMAIN GROUP MANAGEMENT TABLE

FIG. 7

| CHUNK GROUP# | RAID LEVEL | CHUNK CONFIGURATION | FBOF RECOVERY/NO RECOVERY FLAG |
|---|---|---|---|
| 000 | RAID5 (3D1P) | C11, C21, C31, C41 | OK |
| 001 | RAID6 (3D2P) | C12, C22, C32, C42, C51 | OK |
| 002 | RAID5 (4D1P) | C13, C23, C33, C43, C52 | OK |
| 003 | RAID5 (3D1P) | C24, C34, C44, C53 | NG |
| ... | ... | ... | ... |

CHUNK GROUP MANAGEMENT TABLE

FIG. 8

| LU# | PARTIAL REGION HEAD ADDRESS | CHUNK GROUP# | OFFSET IN CHUNK GROUP |
|---|---|---|---|
| 000 | 0000 | 1 | 2000 |
| 000 | 1000 | 1 | 1000 |
| 001 | 0000 | 1 | 2000 |
| 001 | 1000 | 2 | 0000 |
| ... | ... | ... | ... |

PAGE MAPPING TABLE

| CHUNK GROUP# | OFFSET IN CHUNK |
|---|---|
| 1 | 3000 |
| 1 | 5000 |
| 1 | 6000 |
| 2 | 1000 |
| ... | ... |

EMPTY PAGE MANAGEMENT TABLE

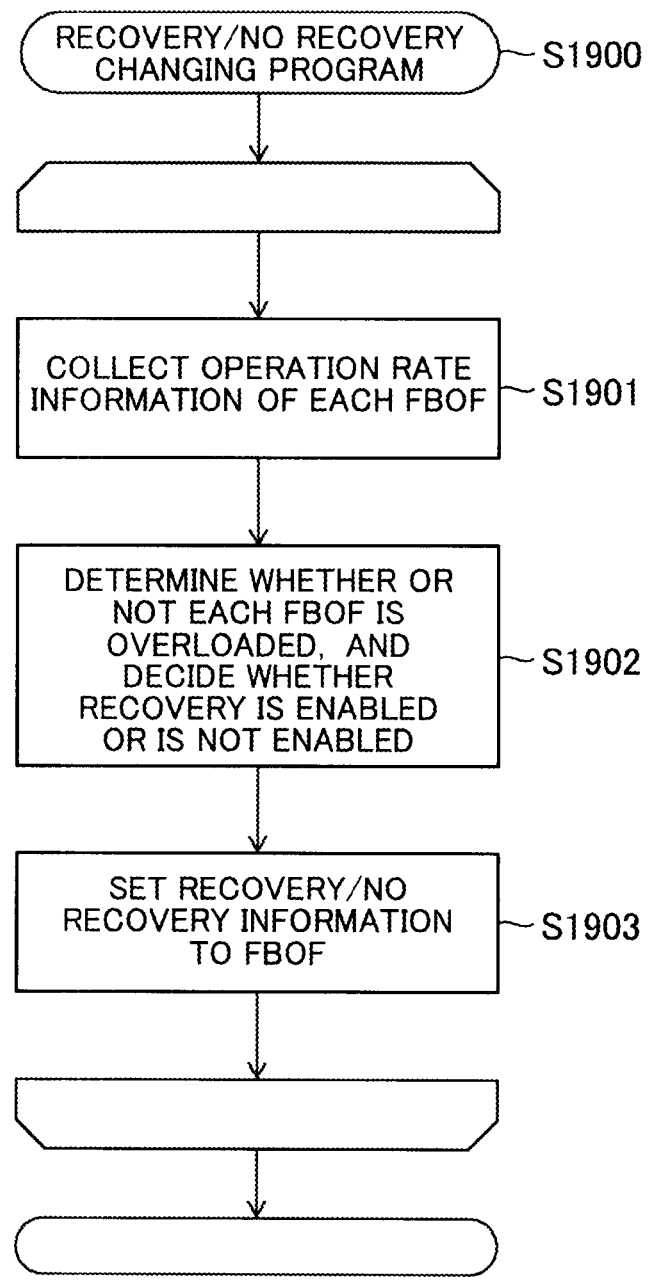

STORAGE SYSTEM AND STORAGE SYSTEM CONTROL METHOD

BACKGROUND

The present invention relates to a storage system and a storage system control method.

For the architecture of a conventional storage system, a dual controller type using a dedicated hardware has been mainstream. In recent years, a Software-defined Storage (SDS) that builds the storage system by a general-purpose server has been becoming mainstream. Also, as one form of the SDS, a Hyper Converged Infrastructure (HCI) that includes an application and a storage control software together on the general-purpose server has been recognized widely. In this way, the architecture of the storage system has been diversified.

On the other hand, in the recent storage system, a Non Volatile Memory Express over Fabric (NVMe-oF) technique that is a protocol performing data communication at high speed via a network has been spreading as a technique for expanding the application range of a Flash device that can read high-speed data. By using the protocol, even the Flash device via the network can perform data read at high speed. For the purpose of Flash device consolidation on the network, a Drive Box product that is called a Fabric-attached Bunch of Flash (FBOF) and can perform data communication by the technique has also been appearing on the market.

Regarding the SDS/HCI, there is Japanese Unexamined Patent Application Publication No. 2021-157588. Japanese Unexamined Patent Application Publication No. 2021-157588 describes that "A distribution storage system includes one or more storage units including plural physical storage devices (PDEVs), and plural calculators connected to the one or more storage units via a communication network. Each of two or more calculators executes a storage control program (hereinafter, a control program). Two or more control programs share plural storage regions provided by the plural PDEVs and metadata related to the plural storage regions. When a failure has occurred in one of the control programs, the different control program that shares the metadata accesses the data stored in the storage region. When a failure has occurred in one of the PDEVs, the control program recovers the data in the PDEV in which the failure has occurred, by using the redundant data stored in the different PDEV in which the failure has not occurred."

SUMMARY

In the storage system using the network connection type Drive Box (FBOF), transfer data from the drive flows in the network, so that the network is likely to be a bottleneck. When the network connection type Drive Box (FBOF) is the storage unit and the storage controller connected to the storage unit via the network is the calculator, the data transfer always occurs in the network in the case where the calculator performs read from and write to the storage unit.

In particular, when the data recovery process (rebuild process) necessary at the time of drive failure performs the data recovery by the storage controller, the storage controller is required to read a large amount of data via the network for the data recovery, thereby causing the delay of the data recovery process and the instability of the host performance.

As a solution of this problem, a method by which the FBOF having a data redundancy function is used can be considered. However, in the method, the point that the FBOF becomes a performance bottleneck to deteriorate the system performance and the point that data cannot be subjected to redundancy between the FBOFs to deteriorate the reliability become concerns. For this, the rebuild method is required by which while the data redundancy is performed by the storage controller to suppress the load of the FBOF controller, the network transfer amount is small.

To achieve the above object, according to one representative aspect of a storage system and a storage system control method of the present invention, the storage system includes one or more storage units, and a calculator connected to the one or more storage units via a communication network. Each of the one or more storage units has plural physical storage devices that physically store data, and a processor. The calculator has a controller that processes data inputted to and outputted from the storage unit by the processor. The storage system subjects the data to redundancy and stores the redundant data, and when a failure in which the data related to a read request cannot be read from one of the physical storage devices has occurred, reads the data from the readable physical storage device, recovers the data related to the read request from the read data, and transmits the recovered data to a request source of the read request. A process for recovering the data related to the read request from the read data can be selectively executed by the controller of the calculator and the processor of the storage unit.

According to the present invention, in the storage system that accesses the storage unit via the network, while the load of the storage unit can be suppressed, the network transfer amount can be reduced. Objects, configurations, and effects other than the above will be apparent from the description of the following embodiment.

BRIEF DESCRIPTION OF THE DRAWINGS

FIG. 7 is a configuration example of a Chunk Group management table according to the present invention;

FIG. 8 is a configuration example of a page mapping table and an empty page management table according to the present invention;

FIG. 20 is a configuration example of a recovery/no recovery changing program according to the second embodiment.

DETAILED DESCRIPTION

Embodiments will be described below with reference to the drawings.

First Embodiment

Figure 1:
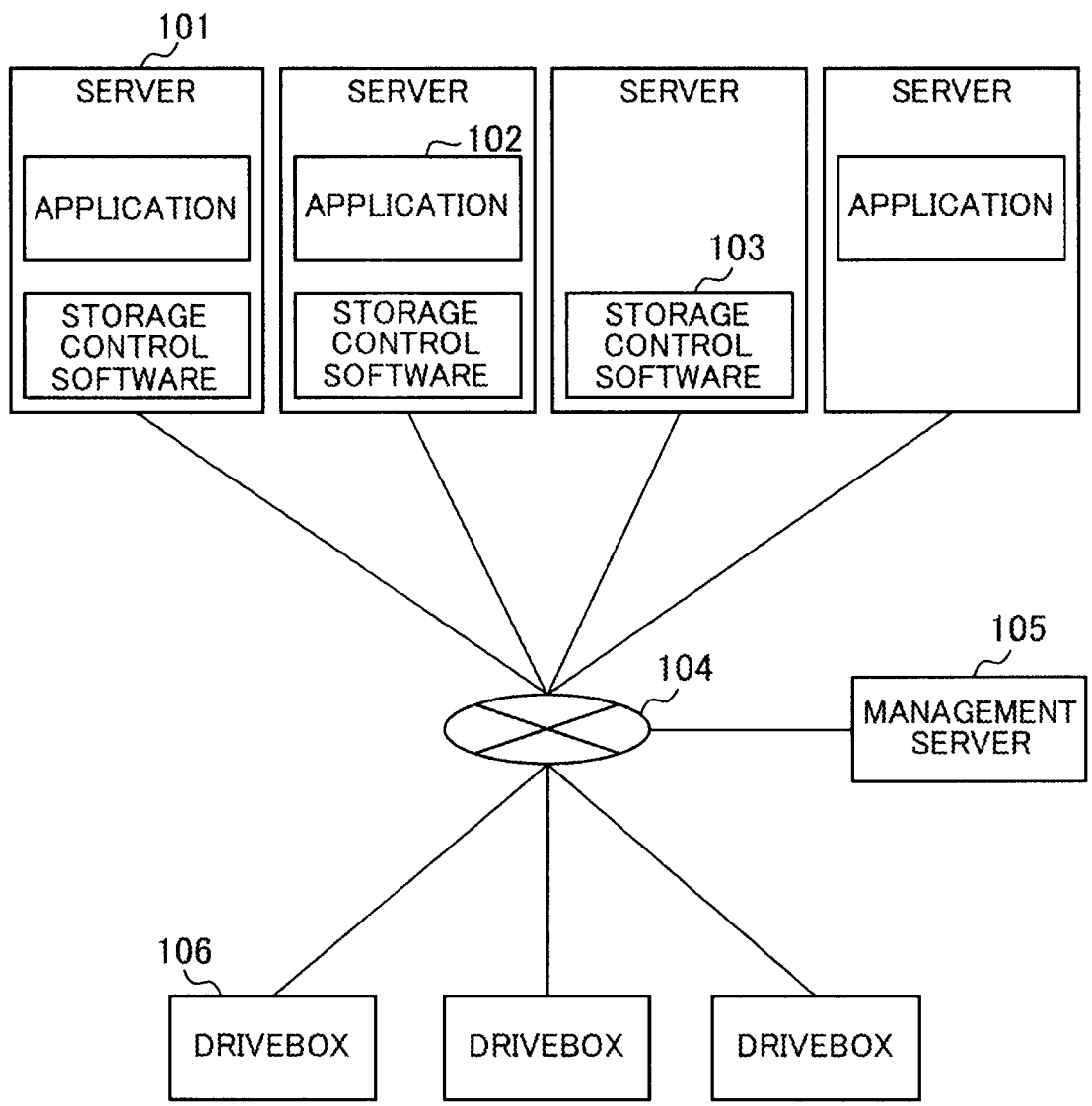
FIG. 1 is a schematic diagram of a storage system according to the present invention.

FIG. 1 is a schematic diagram of a distribution storage system according to this embodiment. The distribution storage system of this embodiment includes plural servers 101, plural Drive Boxes 106, and a management server 105 connected by a network. In each server, a single storage control software 103 and plural applications 102 are present together, and are operated. However, even if the server including only the applications and the server including only the storage control software are present, the same effect can be achieved. Data written from the application is stored in any one of the network-connected Drive Boxes through the storage control software. For a network 104, a general-purpose network technique, such as an Ethernet and a Fibre Channel, can be used. The network may directly connect the servers and the Drive Boxes, or may connect the servers and the Drive Boxes through one or more switches. For a communication protocol, a general-purpose technique, such as an iSCSI (Internet SCSI) and an NVMe-oF, can be used.

Figure 2:
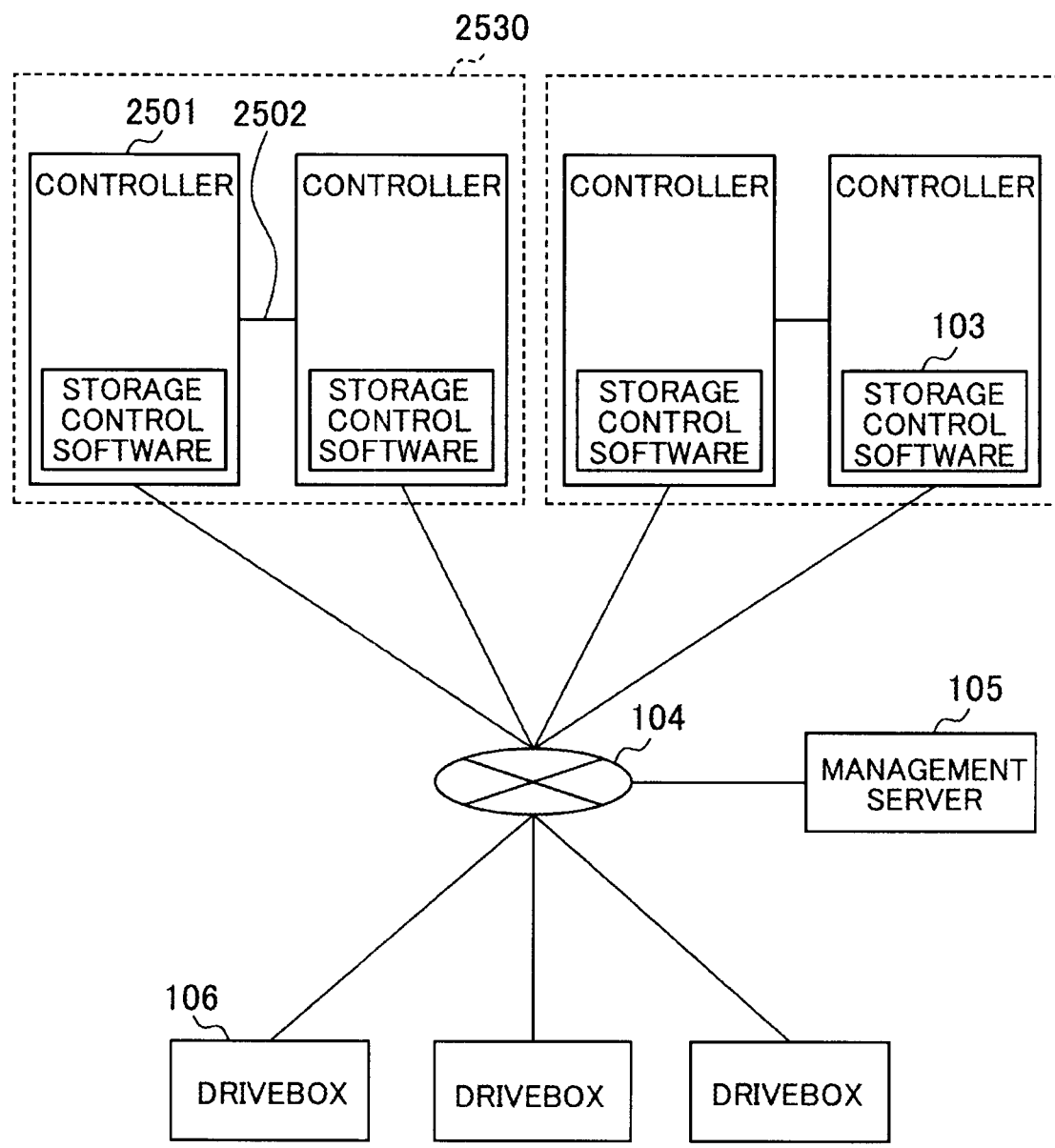
FIG. 2 is a modification example of the configuration of the storage system according to the present invention.

FIG. 2 is another configuration example of the storage system, and the same effect can be obtained also in this configuration.

In this configuration, the storage system is configured in such a manner that plural sets of storage controllers 2503 are arranged, each set of the storage controllers 2503 connected by an interface 2502 faster than the network 104. The single storage control software 103 is operated for each controller 2501, and the respective controllers 2501 communicate with each other. In this configuration, metadata is subjected to redundancy between the set of the controllers, and when a failure has occurred in one controller, failover is performed to the other controller combined with the one controller to continue the process. Write data received by the storage controller is stored in any one of the network-connected Drive Boxes 106 through the storage control software.

Figure 3:
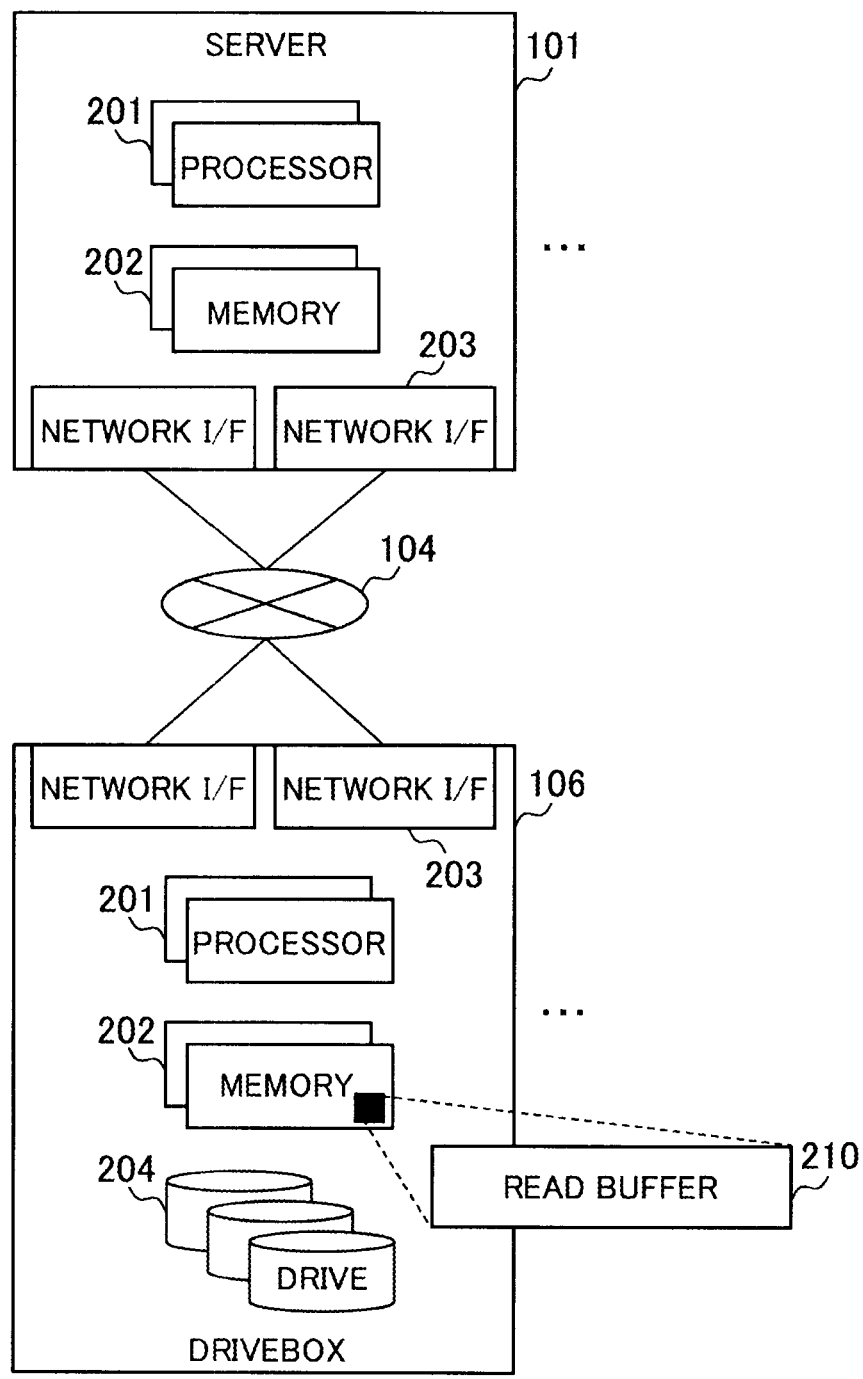
FIG. 3 is a hardware configuration example of a server and a Drive Box according to the present invention.

FIG. 3 is a hardware configuration example of the server and the Drive Box according to this embodiment. The server includes plural processors 201, memories 202, and network I/Fs 203. On the other hand, the Drive Box includes plural drives 204, in addition to the plural processors, memories, network I/Fs. For the memory in the FBOF, a logical region called a read buffer 210 is secured, and the logical region can be used for data transfer between the storage controller and the drive. The server and the Drive Box are connected to the network via the network I/F, and can communicate with each other. For the drive, a general-purpose drive, such as a Hard Disk Drive (HDD) and a Solid State Drive (SSD), can be used. Of course, the present invention may use other types of drives without depending on the types and the form factors of the drives.

Figure 4:
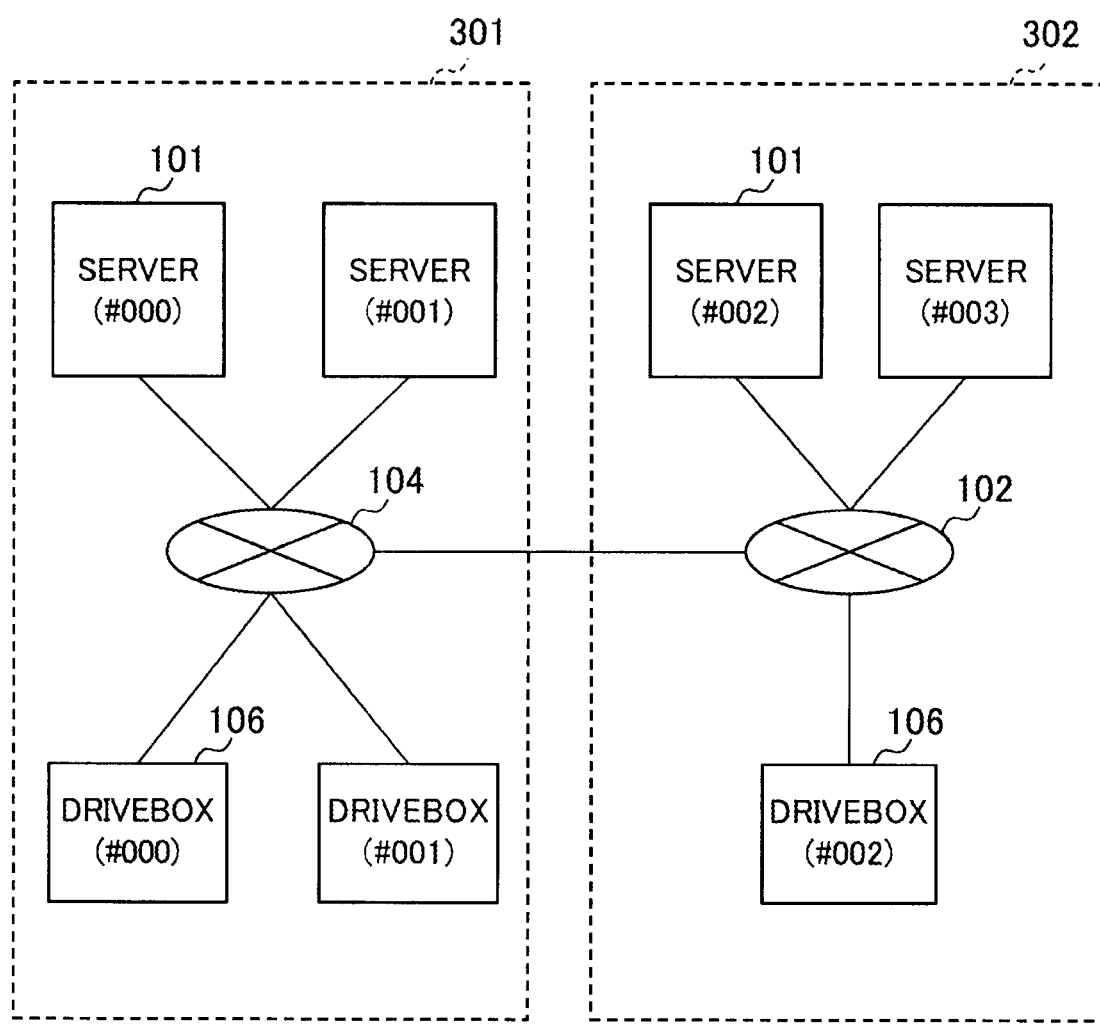
FIG. 4 is another configuration example of the storage system according to the present invention.

FIG. 4 is another configuration example of the distribution storage system according to this embodiment. In this configuration, the servers and the Drive Boxes are group managed by units called Domain Groups 301, 302. In this configuration, data written by the application is stored through the storage control software in any one of the Drive Boxes belonging to the same Domain Group as the server in which the application is operated. For example, the data in the servers #000 and #001 belonging to the Domain Group 301 are stored in the Drive Boxes #000 and #001, and the data in the servers #002 and #003 belonging to the Domain Group 302 are stored in the Drive Box #002. By configuring the distribution storage system by using the Domain Groups in this way, the server performance influence when a failure has occurred in the Drive Box or the drive can be separated between the Domain Groups.

Figure 5:
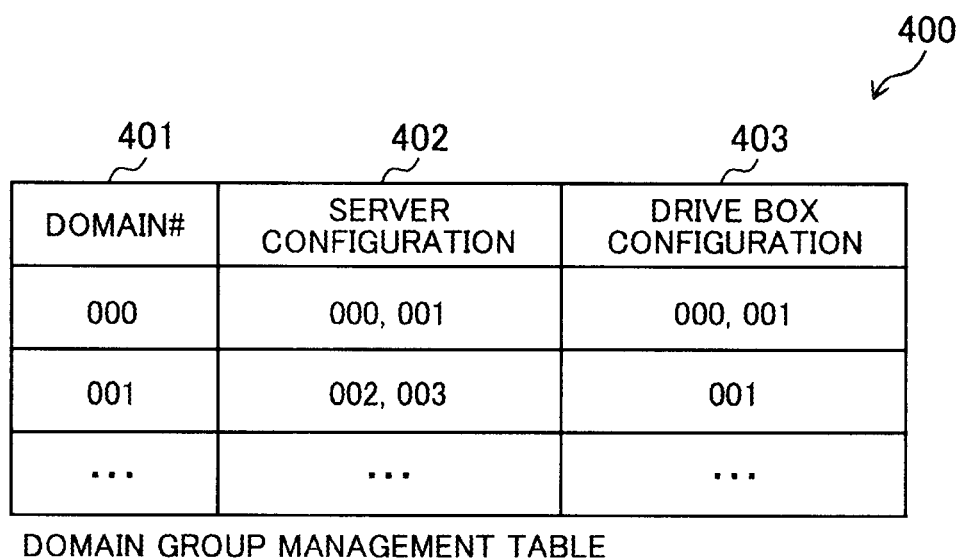
FIG. 5 is a configuration example of a Domain Group management table according to the present invention.

FIG. 5 is a configuration example of a Domain Group management table 400. The Domain Group management table manages the server group and the Drive Box group configuring the Domain Group. The Domain Group management table includes a Domain Group number 401, a server configuration 402, and a Drive Box configuration 403. The Domain Group number 401 stores the identifier of the Domain Group. The server configuration 402 stores the identifier of the server belonging to the Domain Group. The Drive Box configuration 403 stores the identifier of the Drive Box belonging to the Domain Group.

Figure 6:
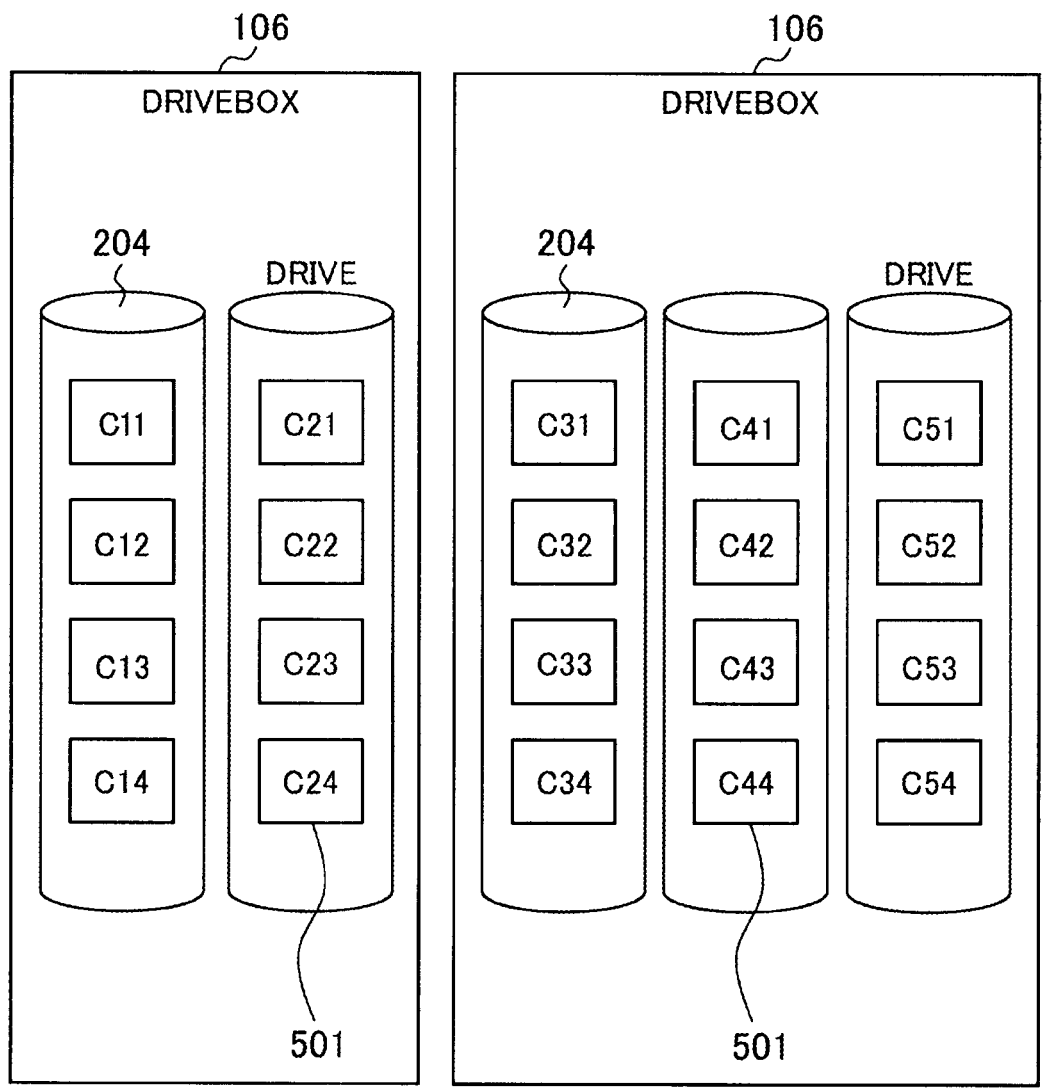
FIG. 6 is an example of a method for managing the regions of plural drives mounted in the Drive Box according to the present invention.

FIG. 6 is an example of a method for managing the regions of the plural drives mounted in the Drive Box according to this embodiment. In this embodiment, the plural drives mounted in the Drive Box are divided into plural fixed size regions called Chunks 501, and are managed.

FIG. 7 is a configuration example of a Chunk Group management table 600. The Chunk Group management table manages a combination of the Chunks forming a RAID configuration. The Chunk Group management table includes a Chunk Group number 601, a data redundancy degree 602, a Chunk configuration 603, and an FBOF recovery/no recovery flag 604. The Chunk Group number 601 stores the identifier of a Chunk Group. The data redundancy degree 602 stores a data protection method indicated by the Chunk Group. The Chunk configuration 603 stores a combination of the Chunks forming the RAID configuration. For example, the Chunk configuration 603 indicates that the Chunk Group #000 uses four Chunks (C11, C21, C31, C41), and is protected by RAID 5 (3D+1P). The FBOF recovery/no recovery flag 604 is a flag indicating whether data can be recovered or cannot be recovered by the FBOF, and stores one of OK and NG.

FIG. 8 is a configuration example of a page mapping table 700 and an empty page management table 710. In this embodiment, like a typical distribution storage, a write region is provided to the application by a unit called an LU (Logical Unit). Each Chunk region is managed by a fixed size region (hereinafter, a page) smaller than the Chunk, and is associated with the LU region. The page mapping table manages the association relationship between the LU region and the Chunk region. Note that this embodiment is described on the assumption that at the time of LU creation, the corresponding pages are assigned to all LU regions, but the page may be assigned only to the particular region by using a general-purpose technique called Thin Provisioning.

The page mapping table 700 includes an LU number 701, a partial region head address 702, a Chunk number 703, and an offset in Chunk 704. The LU number 701 stores the identifier of the LU provided to the application. The partial region head address 702 stores the head address of the partial region divided by the size of the page. The Chunk number 703 and the offset in Chunk 704 store the region information of the page assigned to each partial region.

The empty page management table 710 is a table that manages the page group (empty pages) that can be assigned to the LUs without each server communicating with the different server. A Chunk Group number 711 and an offset in Chunk Group 712 store the region information of each empty page. The empty page is assigned to each server by the representative server, and is added to the table. Also, the empty page assigned at the time of the LU creation is deleted from the table. When the number of empty pages of the certain server is insufficient, the new Chunk Group is created by the representative server, and the region in the Chunk Group is added as the new empty page.

The description of the detail of the sequence of the page assignment control and the empty page control at the time of the LU creation is omitted.

Figure 9:
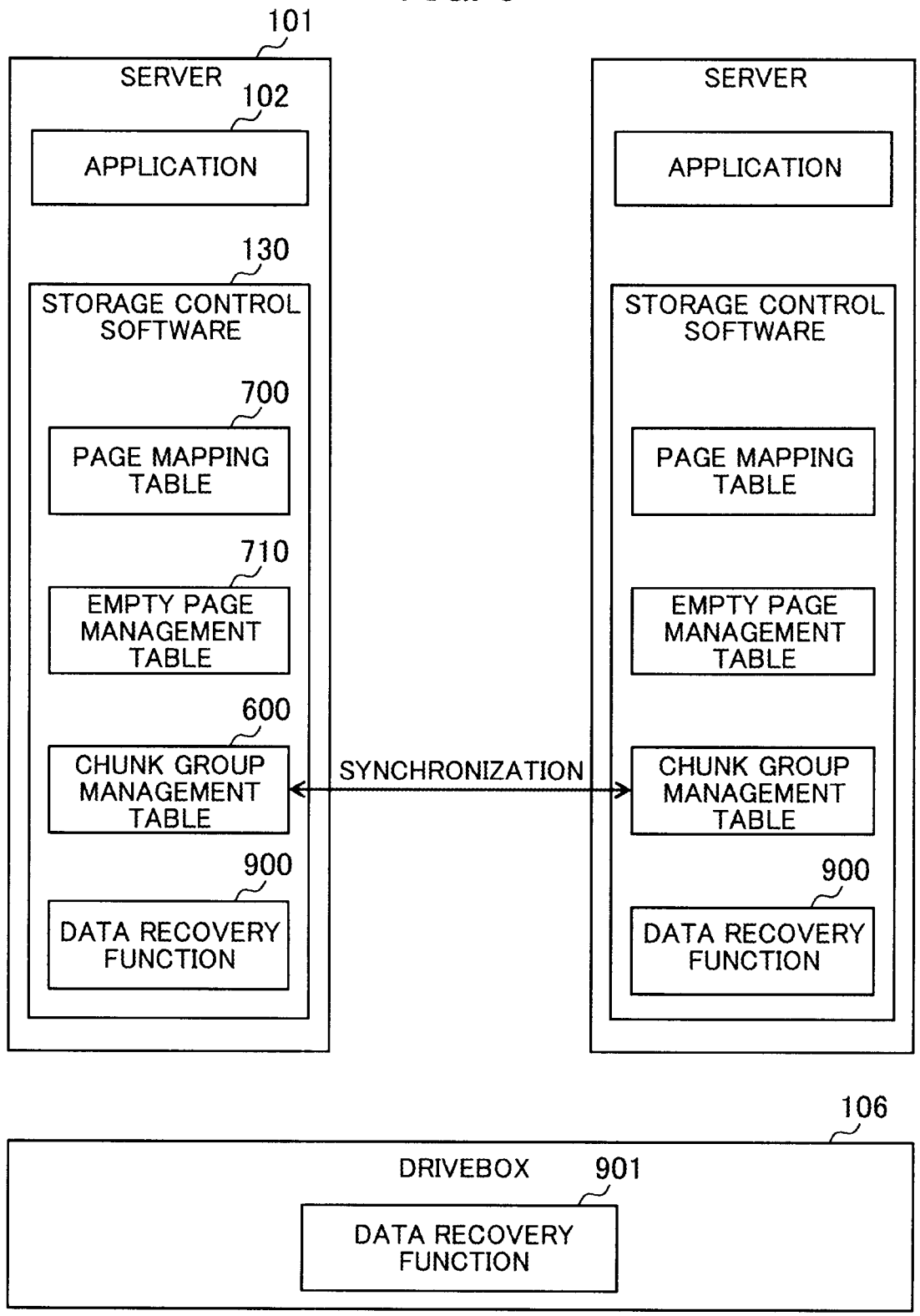
FIG. 9 is an example of a method for disposing, into each server, the page mapping table, the empty page management table, and the Chunk Group management table according to the present invention.

FIG. 9 is an example of a method for disposing, into each server, the page mapping table, the empty page management table, and the Chunk Group management table according to the present invention. First, each server owns, by itself, only the information of the LU used by the application in operation for the page mapping table and the empty page management table related to the LU. This is because when the page mapping table is shared among all the servers, the metadata amount owned by each server becomes huge, so that it takes long time to update the table, thereby affecting the scalability. To cope with metadata losing at the time of server failure, the page mapping table is backed up to the different server configuring the distribution storage system. Also, both of the server and the Drive Box have a data recovery function described later (900, 901).

On the other hand, the Chunk Group management table is synchronized between the servers configuring the distribution storage system and each including the storage control software being operated, thereby enabling all the servers to refer to the same configuration information. With this, when being moved to the different server, the application and the LU can be moved without data copy without re-configuring the data and the parity, and even the moving destination server can continue the data protection.

The storage system of the present invention can monitor the states of all the drives mounted in each FBOF, and manage the states. For the drive state, one of "normal" and "failed" is managed. The system periodically monitors each drive state, and keeps "normal" and "failed" to up to date.

The first embodiment discloses the method by which in the configuration storing data in the single FBOF, when a failure has occurred in any one of the drives in the FBOF, the storage controller and the FBOF controller are cooperated to perform the data recovery in the interior of the FBOF, thereby transferring only the data that becomes a recovery result, from the FBOF to the server. By the method, the read cost of the network at the time of the data recovery can be suppressed, and the system performance can be stabilized.

Figure 10:
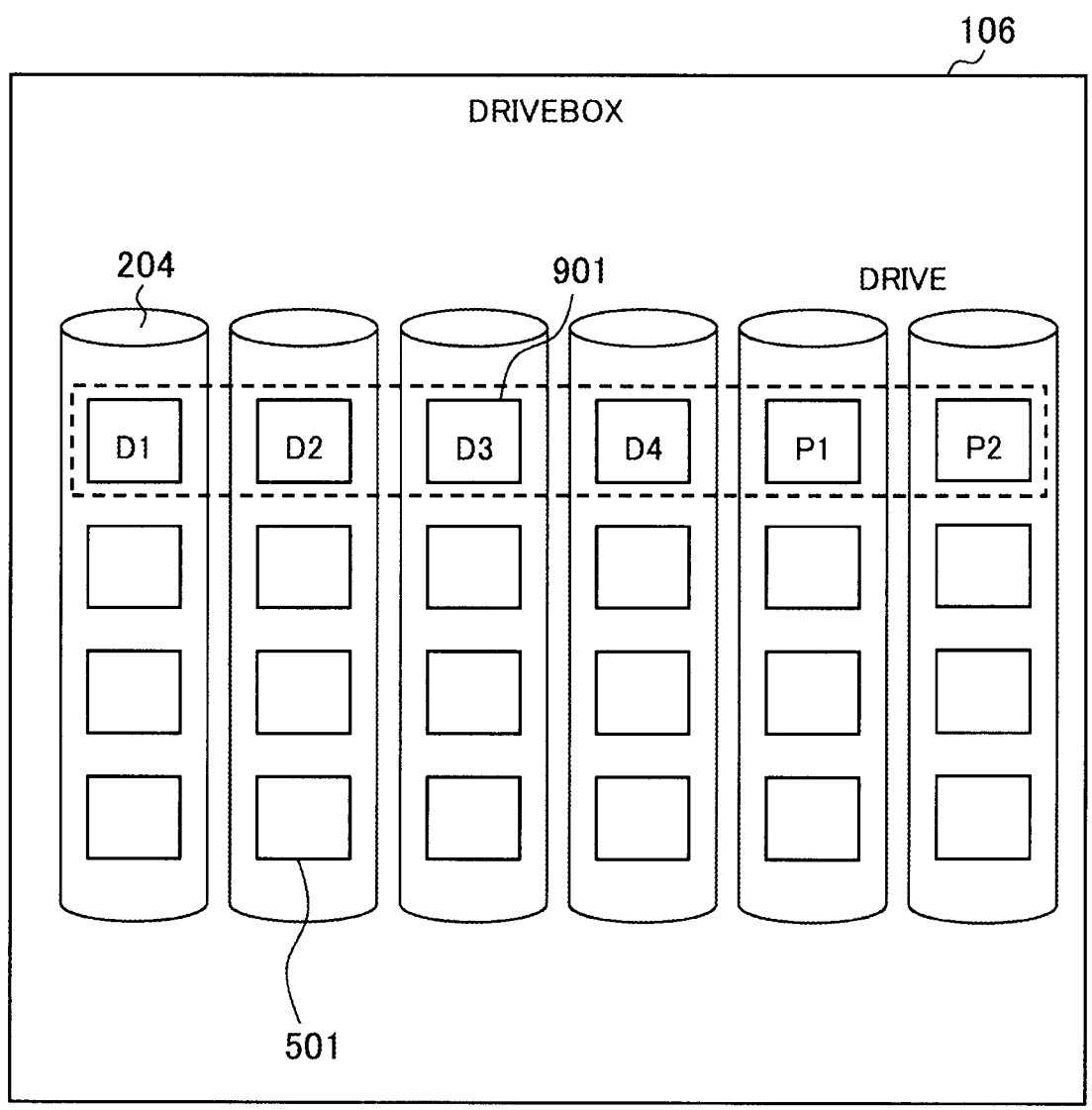
FIG. 10 is a configuration example of a Chunk Group according to a first embodiment.

FIG. 10 is a configuration diagram related to a method for managing the regions of the respective drives mounted in the FBOF in this embodiment. The respective drives mounted in the FBOF are divided and managed by the unit of a fixed length called the Chunk. The storage controller selects plural Chunks from the different drives, and subjects data to redundancy between the Chunks. The plural selected Chunks are called the Chunk Group.

This configuration diagram illustrates the detail by taking the data redundancy method of 4D2P as an example. In the case of the 4D2P, the storage controller selects six Chunks (that are respectively labeled with D1, D2, D3, D4, P1, P2) from among the different devices mounted in the same FBOF, thereby configuring the Chunk Group. The Chunk Group stores data in the regions of the D1, D2, D3, D4. Also, two parities are created by using the data group, and are stored in the regions of the P1, P2. For the parity creation method, the same method as the conventional RAID 6 method can be used. For this, the detail thereof is omitted in this embodiment.

Note that the configuration of this embodiment does not depend on the data redundancy degree method. That is, the Chunk Group can be configured of any number of data pieces and parities, and for example, even if the data method of 6D1P is adopted, the same effect can be obtained.

Figure 11:
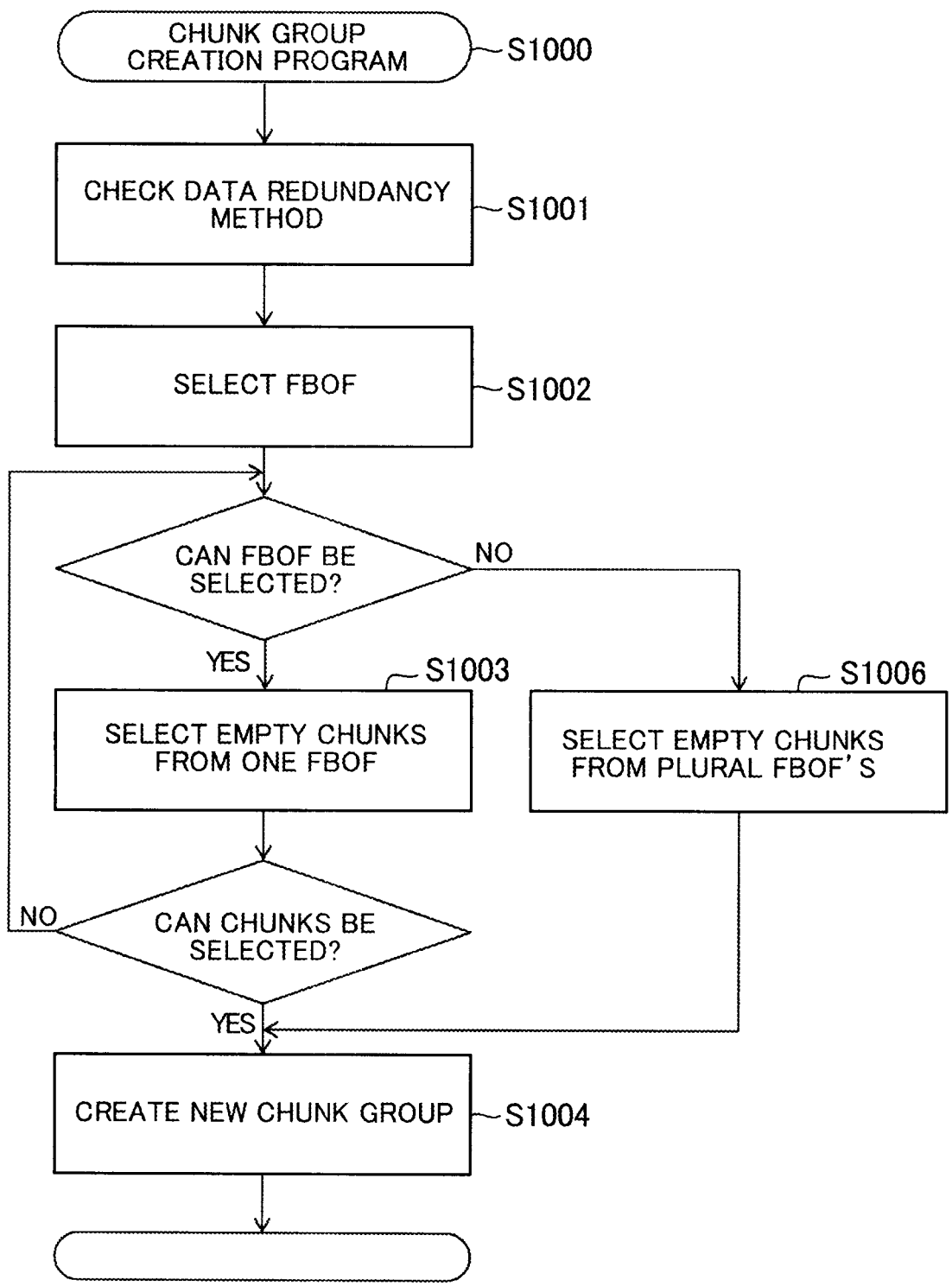
FIG. 11 is a configuration example of a Chunk Group creation program according to the first embodiment.

FIG. 11 is a configuration example of a Chunk Group creation program according to this embodiment. The Chunk Group creation program is a program for providing the new data storage region (Chunk Group) in which data is subjected to redundancy. The program is executed by the storage controller when the data storage region of the storage system is insufficient. In this embodiment, a necessary number of Chunks are selected from the different drives in the single FBOF so that the data recovery can be performed in the FBOF, thereby creating the Chunk Group.

First, the Chunk Group creation program checks the data redundancy method set to the storage controller (example: 4D2P) (1001). Next, the FBOF that creates the Chunk Group is selected (1002). There are various FBOF selection methods. For example, there is a method for selecting the FBOF in which the number of empty Chunks is small, but the present invention is not limited to this. Next, the Chunks not belonging to any of the Chunk Groups are respectively selected from the drives in number designated by the data redundancy method (in the case of the 4D2P, six drives) (1003), and the new Chunk Group is configured (1004).

When the Chunks configuring the Chunk Group cannot be selected in (1003), the different FBOF is selected to attempt to create the Chunk Group. When the Chunk Group cannot be created for all the FBOFs, the Chunks are selected from the drives belonging to the plural FBOFs (1006) to create the Chunk Group. Since the Chunk Group created in this way cannot perform the complete data recovery on the FBOF side, NG is written to the FBOF recovery/no recovery flag of the Chunk Group in the Chunk Group table, which can be discriminated from the case where the Chunk selection is not across the different FBOF (OK).

Figure 12:
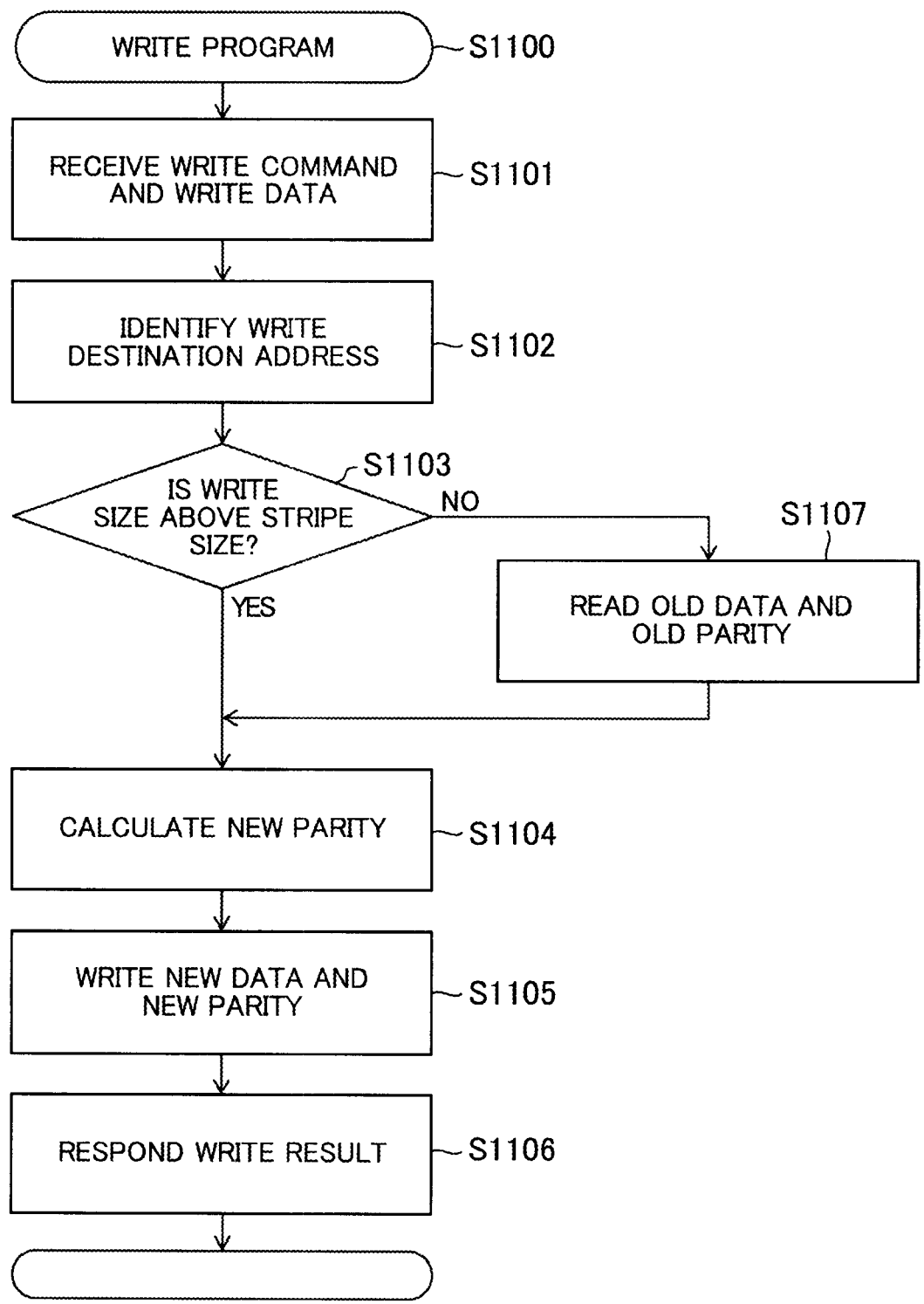
FIG. 12 is a configuration example of a write program according to the first embodiment.

FIG. 12 is a configuration example of a write program according to this embodiment. The write program is a program for subjecting write data to redundancy by creating the parity corresponding to the data according to the configuration information of the Chunk Group that becomes the write destination of the write data and writing the data and the parity to the appropriate drive.

First, the storage controller of any one of the servers in the storage system receives a write request from the host. The storage controller transfers the write request to the storage controller having the owner right of the data (1101). The transfer destination storage controller appropriately performs a write process, and responds a write result to the transfer source storage controller. Last, the transfer source storage controller responds the write result to the host (1106).

The storage controller that performs the write process determines whether or not the requested write size exceeds the stripe size (1102). When the write size is above the stripe size, the storage controller performs full stripe write. In the full stripe write, first, the storage controller refers to the page mapping table, and checks the set of the Chunk number and the offset corresponding to the write destination address (1103). Next, the parities (P1, P2) are calculated from the write data (D1, D2, D3, D4) (1104), and the D1 to D4, P1, P2 are each written to the drive number/offset corresponding to the Chunk number/offset (1105).

When the write size does not exceed the stripe size, the storage controller performs partial write. For the partial write, first, the storage controller refers to the page mapping table, and checks the set of the Chunk number and the offset corresponding to the write destination address. For convenience of the description, after the checking, the write is write to the region labeled with the D1. In this case, the storage controller reads the data and the parities stored in the write destination address of the D1, P1, P2 (1107), performs parity calculation (1104), and writes each of the D1, P1, P2 to the drive number/offset corresponding to the Chunk number/offset (1105).

Figure 13:
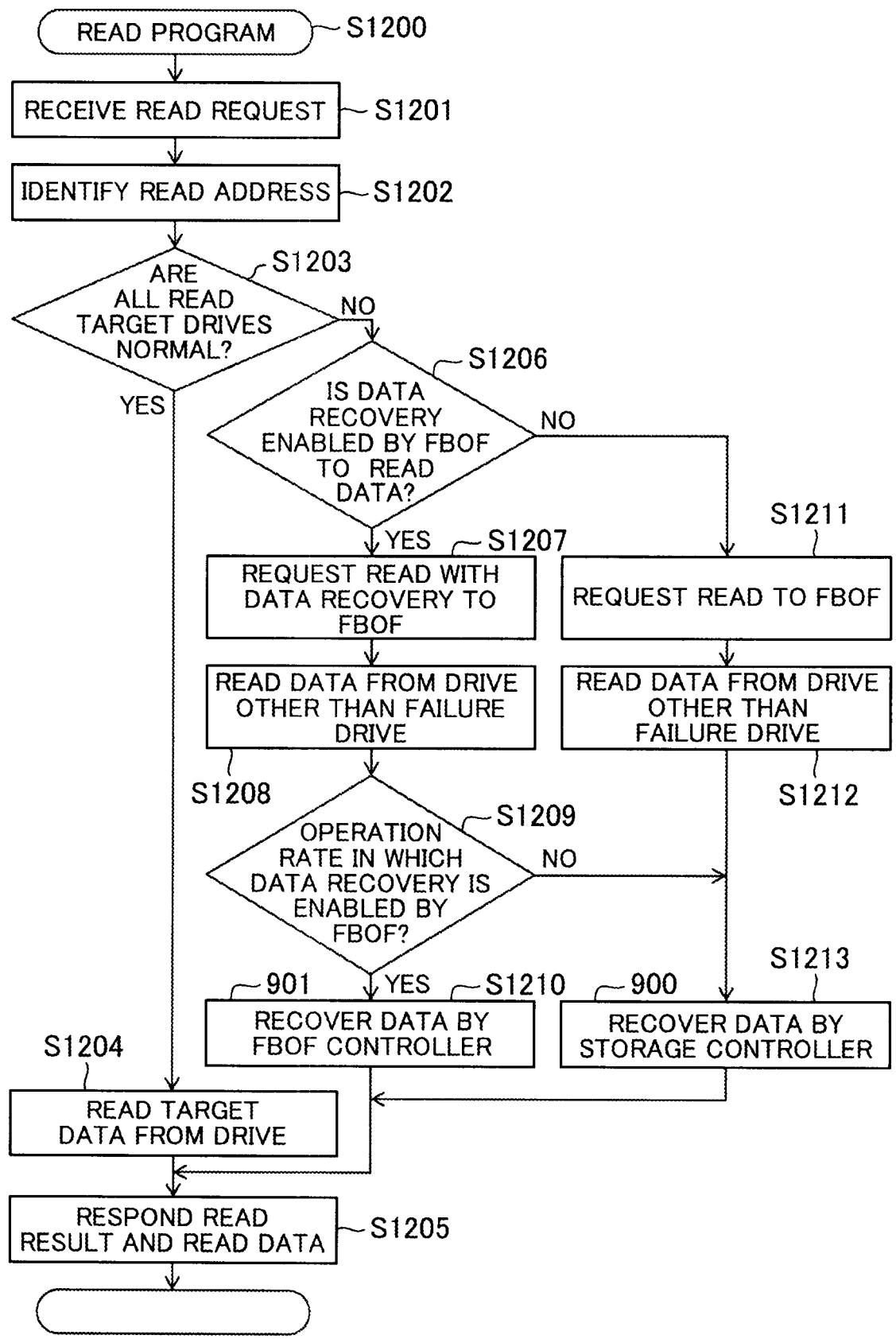
FIG. 13 is a configuration example of a read program according to the first embodiment.

FIG. 13 is an example of a read program according to this embodiment. The read program is a program for reading data from the drive according to the configuration information of the Chunk Group in the read target region. In particular, when there has been a failure in the read target drive, the data recovery is performed in the interior of the FBOF, and only the data that becomes a recovery result is transferred from the FBOF to the server.

First, the storage controller of any one of the servers in the storage system receives a read request from the host. The storage controller transfers the read request to the storage controller owning the owner right of the data (1201). The storage controller that receives the transfer request appropriately performs a read process, and responds a read result to the transfer source storage controller. Last, the transfer source storage controller responds the read result to the host (1205).

First, the storage controller that performs the read process refers to the page mapping table, and checks the set of the Chunk number and the offset corresponding to the read destination address (1202). Next, the failure state of the drive in which the checked Chunk number is stored is checked (1203). When the failure states of all the drives are "normal", the storage controller reads the drive number/offset data corresponding to the Chunk number/offset to respond the drive number/offset data to the host (1204, 1205).

When the drive in which the failure state is "failed" is included, the storage controller determines whether the data recovery is enabled by the FBOF to read the data (1206). When the requested read size is above the stripe size and the FBOF recovery/no recovery flag is OK, it is determined that the data recovery is enabled. When the data recovery is enabled, the storage controller issues a read request with data recovery to the FBOF controller (1207). The read request with data recovery includes the read address including the failure location (the drive number and the offset), the read amount (the read range), and the recovery method at the time of the data recovery (the corresponding parity position and the encoding method (XOR and the like)).

The FBOF controller that receives the read request with data recovery reads the data in the designated read range from the drive, and stores the data in the read buffer (1208). Thereafter, the FBOF controller checks its own operation rate information, and determines whether the read process with data recovery can be received (1209). For the operation rate information, typical information, such as the CPU operation rate, the read buffer usage rate, and the memory bandwidth usage rate of the FBOF controller, can be used. When the operation rate/usage rate is lower than the fixed threshold value and it is determined that the read process with data recovery can be received, the data that cannot be read due to drive failure is recovered from the data read into the read buffer (1210, 901). At this time, for the data recovery method, the recovery method designated by the storage controller is used. For example, the data of the parity position is read, and the XOR with the data that has already been read into the read buffer is calculated, thereby performing the data recovery. After the data recovery, the FBOF controller responds the data to the storage controller when all the requested data can be prepared.

When it is determined in 1206 that the data recovery is not enabled by the FBOF, a read request without recovery is issued to the FBOF controller (1211). The read request includes the read address, the read amount (the drive number and the offset), and the parity position. The FBOF controller that receives the read request reads the data and the parity from the drive except for the failure drive, and stores the data and the parity in the read buffer (1212). Thereafter, the FBOF controller transfers the data and the parity to the storage controller, and the storage controller recovers the data by using the parity (1213, 900). Likewise, when it is determined in 1209 that the data recovery is not enabled by the FBOF, the FBOF controller transfers the data to the storage controller to respond "recovery failed", and the storage controller recovers the data.

Figure 14:
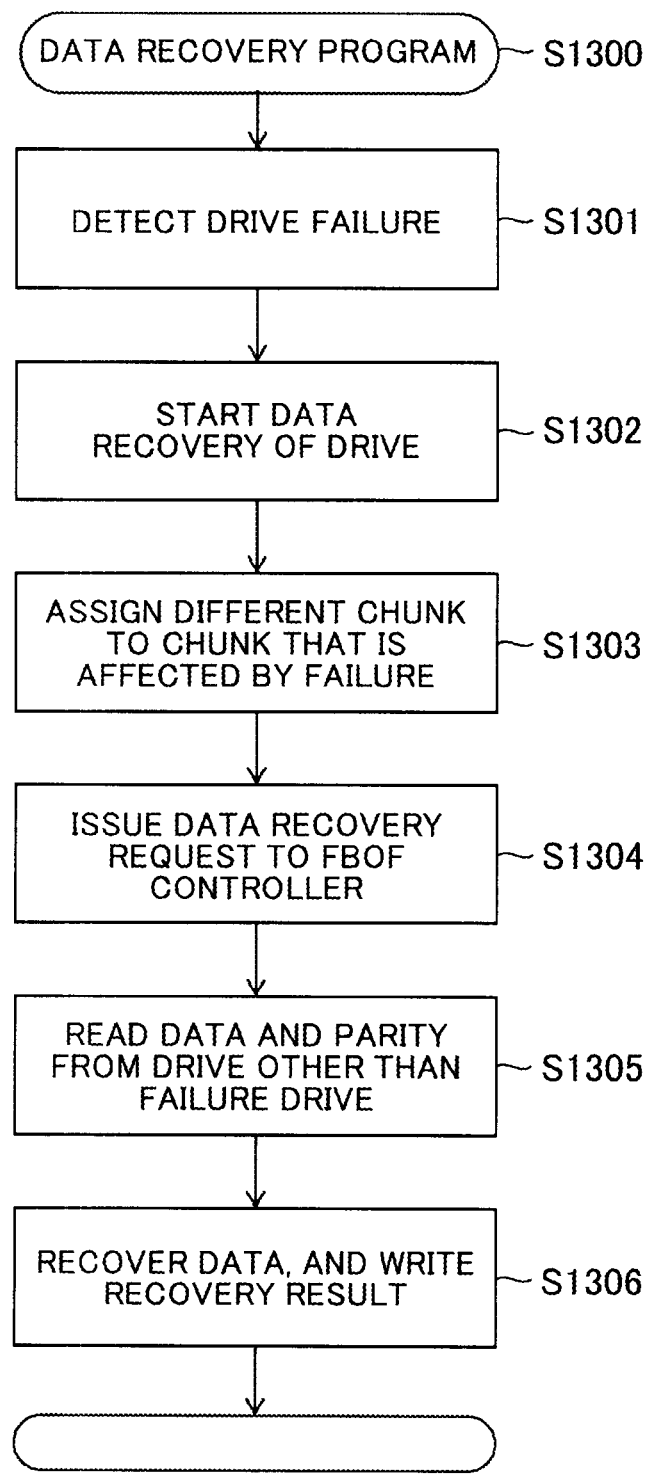
FIG. 14 is a configuration example of a data recovery program according to the first embodiment.

FIG. 14 is a configuration example of a data recovery (rebuild) program according to this embodiment. The data recovery program is a program that is executed by the storage controller when a drive failure has occurred, and after the recovery of the data in the failure drive, the recovery data is written to the designated region.

First, any one of the storage controllers detects a failure in the drive in the FBOF (1301). After the fixed time, or according to the user instruction, the storage controller starts the data recovery of the drive in which the failure has occurred (1302). The storage controller assigns the different empty Chunk to the Chunk that is affected by the failure (1303). The storage controller repeatedly issues a data recovery request to the FBOF controller of the FBOF in which the failure drive is mounted, for each address of the Chunk with respect to the failure drive (1304). The data recovery request includes the set of the address information necessary for the data recovery, the write destination address of the recovery data, and the recovery method. The FBOF controller reads the designated data and parity into the read buffer (1305), recovers the data by the designated method, and writes a recovery result to the designated region (1306).

Also in the process of the data recovery program, the data recovery by the FBOF controller is enabled like FIG. 13. Note that the data recovery by the storage controller is performed like FIG. 13 when the redundant data is distributed to the plural FBOFs. Also, the data recovery may be performed by the storage controller according to the operation rate of the FBOF.

The method by which in the configuration storing data in the single FBOF, when a failure has occurred in any one of the drives in the FBOF, the storage controller and the FBOF controller are cooperated to perform the data recovery in the interior of the FBOF, thereby transferring only the data that becomes the recovery result, from the FBOF to the server has been illustrated above.

Second Embodiment

A second embodiment discloses a method by which in a configuration dividing and storing data into plural FBOFs, even if a failure has occurred in any one of the drives in the FBOFs, the storage controller and the FBOF controller are cooperated to perform the data recovery in the interior of the FBOF, thereby transferring only the data that becomes a recovery result, from the FBOF to the server. By the method, while the reliability can be increased as compared with the first embodiment, the read cost of the network at the time of the data recovery can be suppressed, and the system performance can be stabilized.

Figure 15:
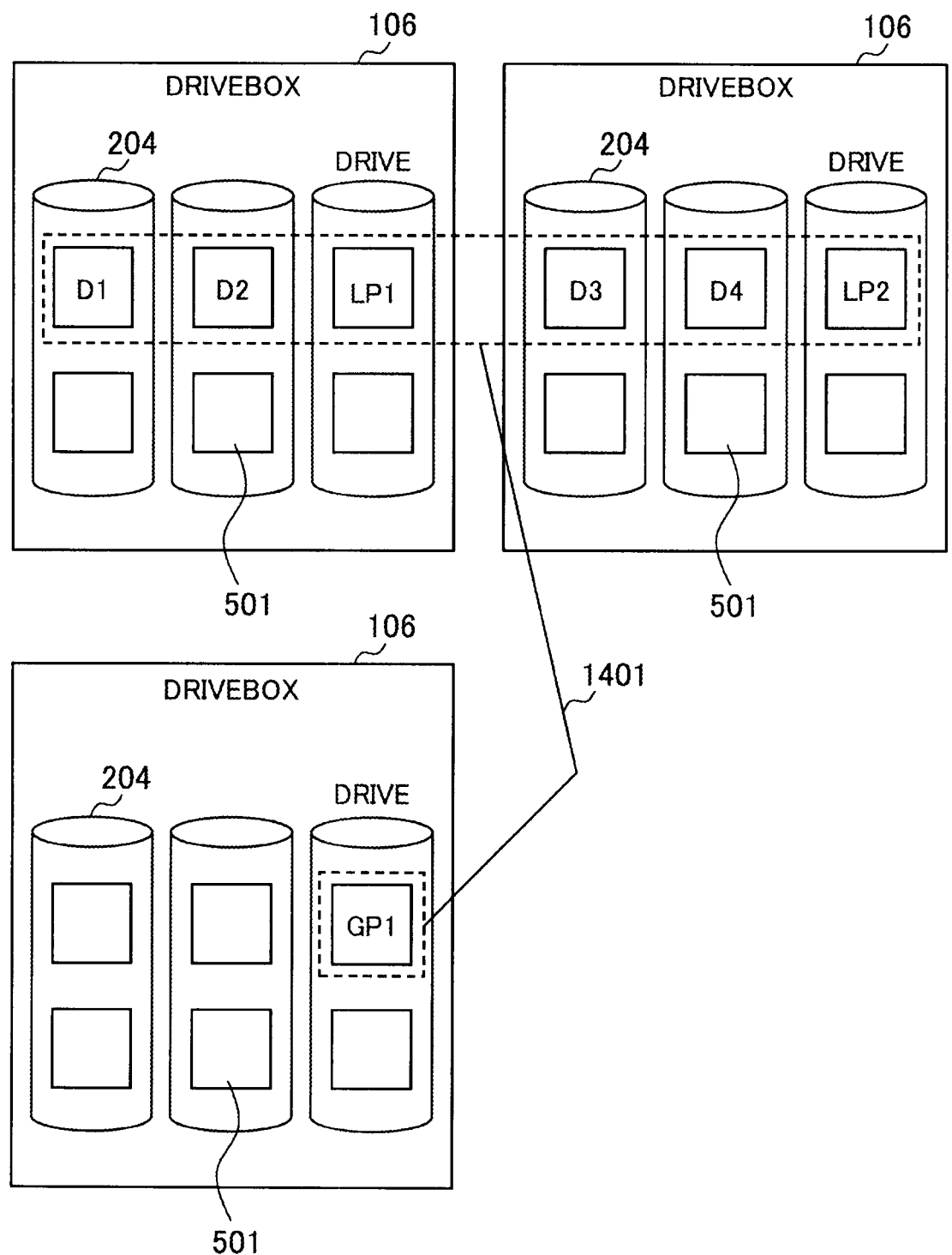
FIG. 15 is a configuration example of a Chunk Group according to a second embodiment.

FIG. 15 is a configuration diagram related to a method for managing the regions of the respective drives mounted in the FBOFs according to this embodiment. Like the first embodiment, each drive mounted in the FBOF is region managed by the Chunk unit. As the point different from the first embodiment, the storage controller of the second embodiment selects the Chunks from the drives in the plural FBOFs to create the Chunk Group, and subjects data to redundancy between the FBOFs.

The Chunk Group of the second embodiment is configured to be able to store two types of parities in order that the FBOF controller enables the data recovery only from the data of the drive mounted in itself. A first parity is a parity created from data stored in the device mounted in the single FBOF, and is called a local parity (LP). A second parity is a parity created from data stored in the device mounted in the different FBOF, and is called a global parity (GP).

By enabling two types of parities to be stored, when the number of failure drives is 1, the data recovery is enabled in the FBOF by using the local parity, and when the data recovery is not enabled by the local parity, the data recovery is enabled by the storage controller by using the global parity. By the method, both of the increased reliability and the reduced network cost can be achieved.

Hereinafter, the data redundancy method using the local parity and the global parity is defined as an (L, M, N) method. In the (L, M, N) method, L+M+N Chunks are selected to configure the Chunk Group. Of the Chunks configuring the Chunk Group, the L Chunks store the data, the M Chunks store the local parity, and the N Chunks store the global parity. The Chunk Group is divided and disposed into the M+N FBOFs, the L÷M Chunks are disposed in each of the M FBOFs, and one Chunk is disposed in each of the N FBOFs.

This configuration diagram illustrates the detail by taking a (4, 2, 1) method as an example. In the case of the (4, 2, 1) method, the storage controller selects, from three FBOFs, three Chunks, three Chunks, and one Chunk (respectively labeled with D1, D2, D3, D4, LP1, LP2, GP1), respectively to configure the Chunk Group.

In the respective FBOFs, the Chunks are disposed as follows. First, the D1, D2, LP1 are disposed in the first FBOF. The LP1 is a region storing the parity configured of the D1, D2. Likewise, the D3, D4, LP2 are disposed in the second FBOF. The LP2 is a region storing the parity configured of the D3, D4. The GP1 is disposed in the third FBOF. The GP1 is a region storing the parity configured of the D1, D2, D3, D4.

Note that the configuration of this embodiment does not depend on the data redundancy degree method. That is, the Chunk Group can be configured of any number of data pieces and parities, and for example, even if a data method that is a (6, 2, 2) method is adopted, the same effect can be obtained. In the case of the (6, 2, 2) method, for example, (D1, D2, D3, LP2), (D1, D2, D3, LP2), (GP1), and (GP2) should be disposed in four FBOFs.

Figure 16:
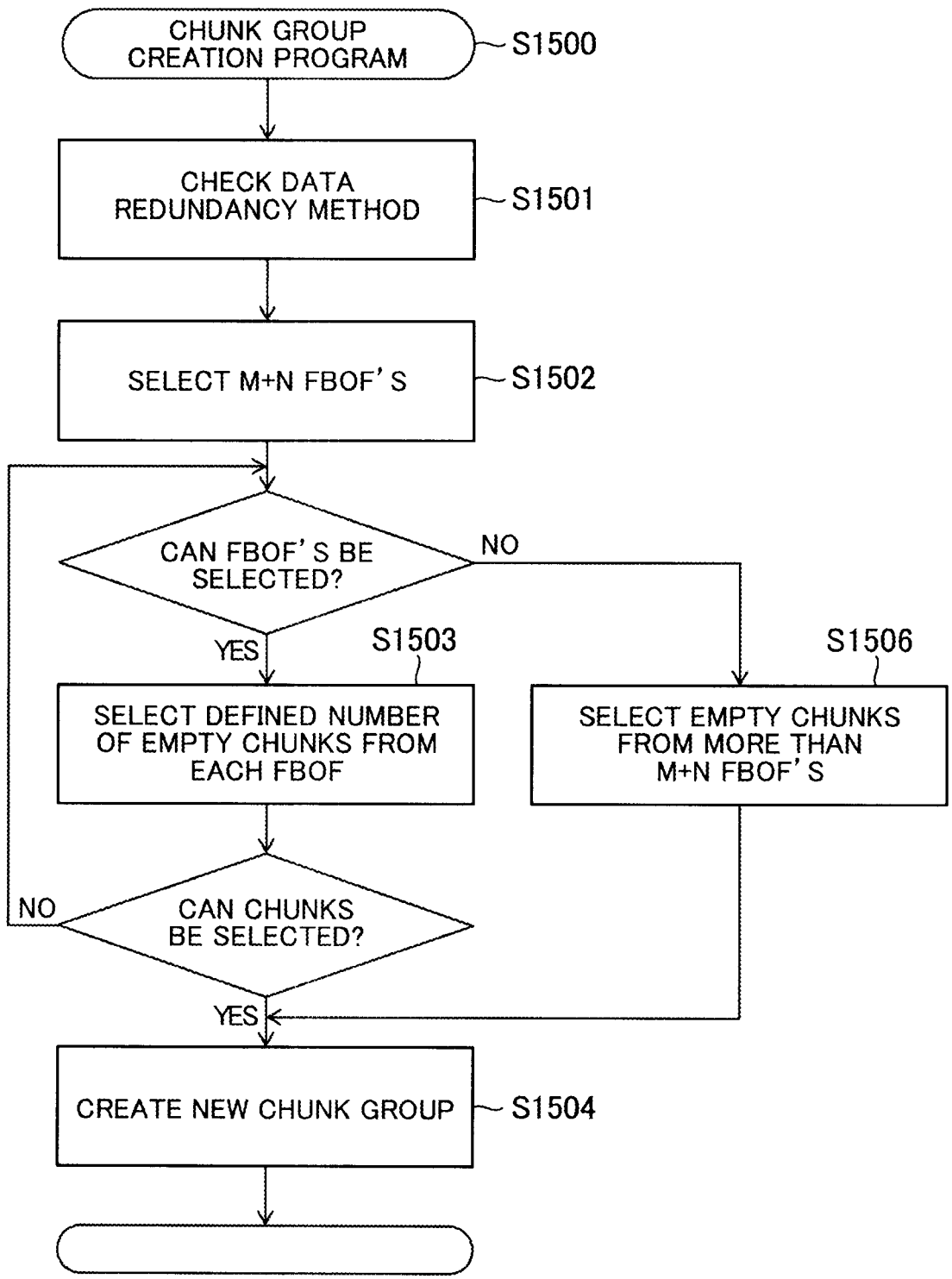
FIG. 16 is a configuration example of a Chunk Group creation program according to the second embodiment.

FIG. 16 is a configuration example of a Chunk Group creation program according to this embodiment. The Chunk Group creation program of the second embodiment selects the Chunks from the different drives in the plural FBOFs to create the Chunk Group.

First, the Chunk Group creation program checks the data redundancy method set to the storage controller (example: (4, 2, 1) method) (1501). Next, M+N (in the (4, 2, 1) method, three) FBOFs for creating the Chunk Group are selected (1502). For the FBOF selection method, the method described in the first embodiment can be used. Next, a necessary number of Chunks not belonging to any of the Chunk Groups are respectively selected from the drives in number designated by the data redundancy method (1503), and the new Chunk Group is configured (1504).

When the Chunk Group cannot be configured in (1503), the different FBOF is selected to create the Chunk Group. When the Chunk Group cannot be created for all the FBOFs, the Chunks are selected from the drives belonging to more than M+N FBOFs (1505) to create the Chunk Group. Since the Chunk Group created in this way cannot perform the complete data recovery on the FBOF side, NG is written to the FBOF recovery/no recovery flag, which can be discriminated from the case where the Chunk selection is not across the different FBOF (OK).

Figure 17:
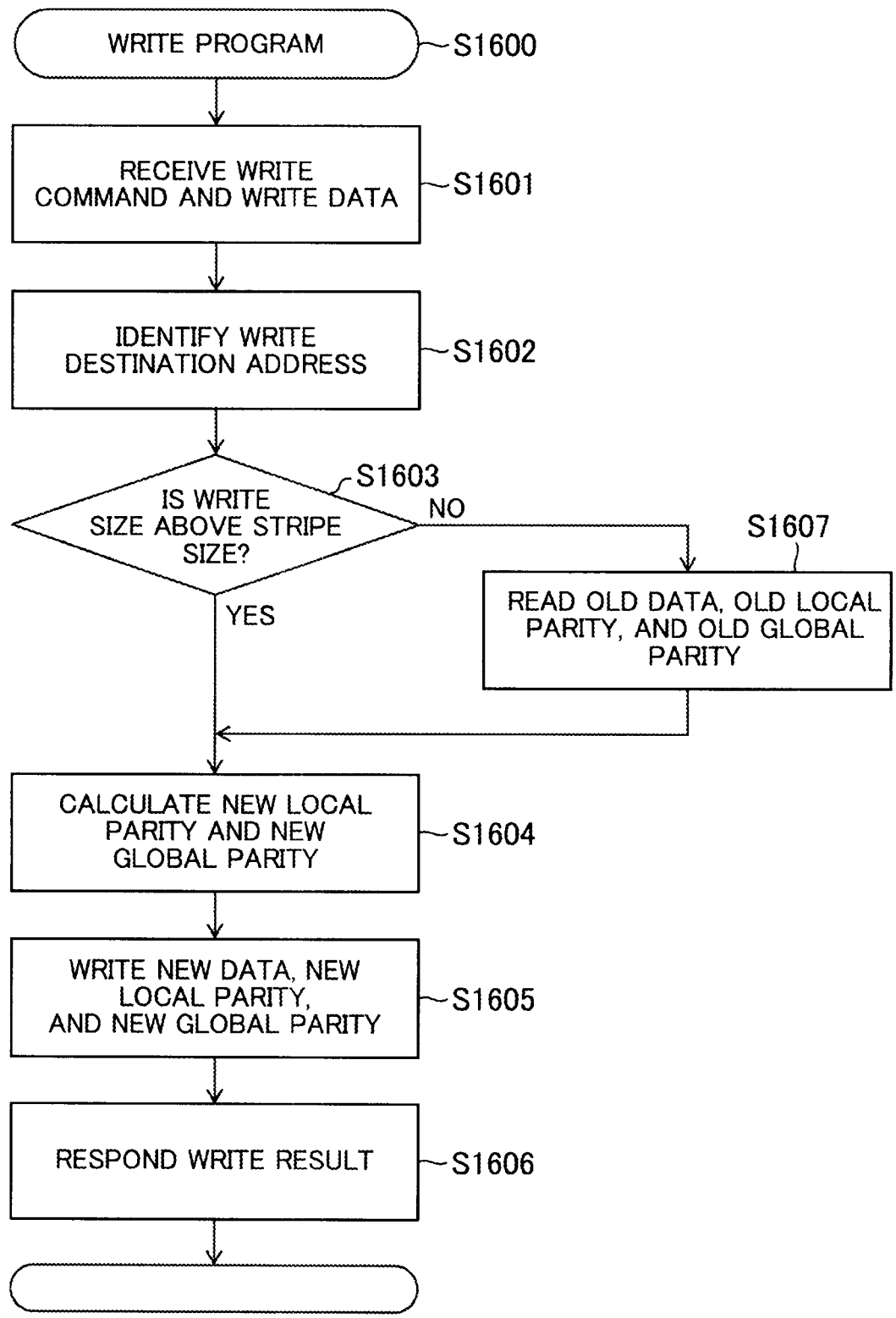
FIG. 17 is a configuration example of a write program according to the second embodiment.

FIG. 17 is an example of a write program according to this embodiment. The write program of the second embodiment is a program for subjecting write data to redundancy by creating the local parity and the global parity corresponding to the data and writing the data, the local parity, and the global parity to the appropriate drive.

The storage controller that performs a write process determines whether or not the requested write size exceeds the stripe size (1603). When the write size exceeds the stripe size, the storage controller performs full stripe write. The Chunk Group management table is referred, and the Chunk number and the Offset number corresponding to the write destination address are checked. Next, the local parity (LP1) configured of the D1, D2 and the local parity (LP2) configured of the D3, D4 are created. Also, the global parity (GP1) configured of the D1, D2, D3, D4 is created (1604). The storage controller writes the new data, the new local parity (LP2), and the new global parity (GP1) to the corresponding regions (1605). Thereafter, the storage controller responds a write result (1606), and ends the process.

When the write size does not exceed the stripe size, the storage controller performs partial write. First, for the partial write, the storage controller refers to the Chunk Group management table, and checks the set of the Chunk number and the offset corresponding to the write destination address. For convenience of the description, after the checking, the write is write to the region labeled with the D1. In this case, the storage controller reads the data and the parities stored in the write destination address of the D1, LP1, GP1 (1607), performs parity calculation (1604), and writes each of the D1, LP1, GP1 to the drive number/offset corresponding to the Chunk number/offset (1605). Thereafter, the storage controller responds a write result (1606), and ends the process.

Figure 18:
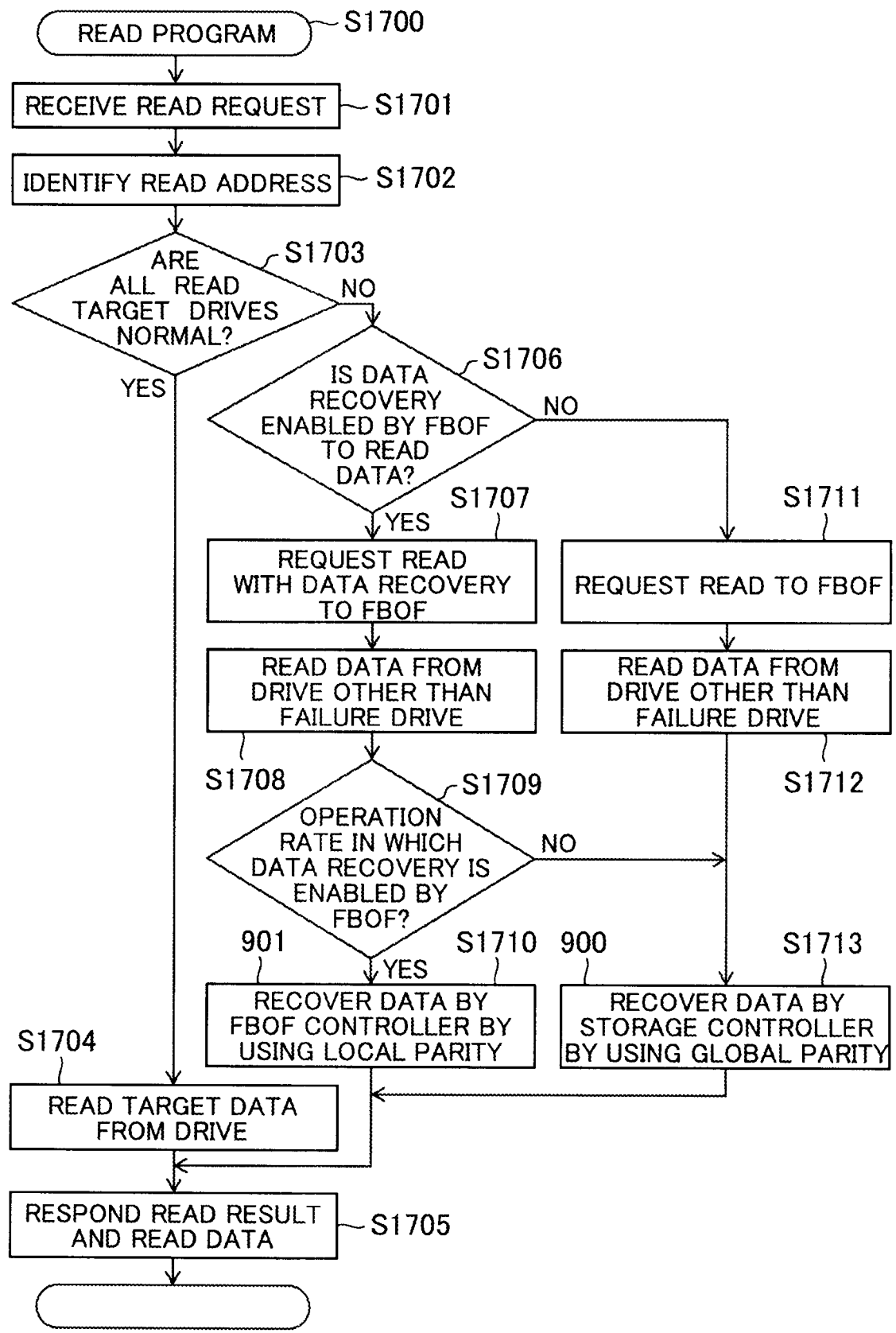
FIG. 18 is a configuration example of a read program according to the second embodiment.

FIG. 18 is an example of a read program according to this embodiment. When all the drive states are "normal", the data can be read by the same method as the read program of the first embodiment, so that the description thereof is omitted.

When the drive in which the failure state is "failed" is included in the read range, the storage controller determines whether the data recovery is enabled by the FBOF to read the data (1706). When the requested read size is above (the stripe size÷M), the number of failure drives is 1, and the FBOF recovery/no recovery flag is OK, it is determined that the data recovery is enabled (1707). When the data recovery is enabled, the storage controller issues a read request with data recovery to the FBOF controller. The read request with data recovery includes the read address including the failure location (the drive number and the offset), the read amount (the read range), and the recovery method at the time of the data recovery (the corresponding parity position and the encoding method (XOR and the like)).

The FBOF controller that receives the read request with data recovery reads the data in the designated read range from the drive, and stores the data in the read buffer (1708). Thereafter, its own operation rate information is checked, and it is determined whether the read process with data recovery can be received (1709). For the operation rate information, typical information, such as the CPU operation rate, the read buffer usage rate, and the memory bandwidth usage rate of the FBOF controller, can be used. When the operation rate/usage rate is lower than the fixed threshold value and it is determined that the read process with data recovery can be received, the data that cannot be read due to drive failure is recovered from the data read into the read buffer (1710). For the data recovery, the local parity is used, and for the data recovery method, the recovery method designated by the storage controller is used. When it is determined in 1709 that the read process with data recovery cannot be received, the FBOF controller responds "recovery failed" to the storage controller, and responds only the read data. In this case, the storage controller additionally reads the data and the global parity necessary for the recovery, performs the data recovery (1713), and responds the recovered data to the host.

Figure 19:
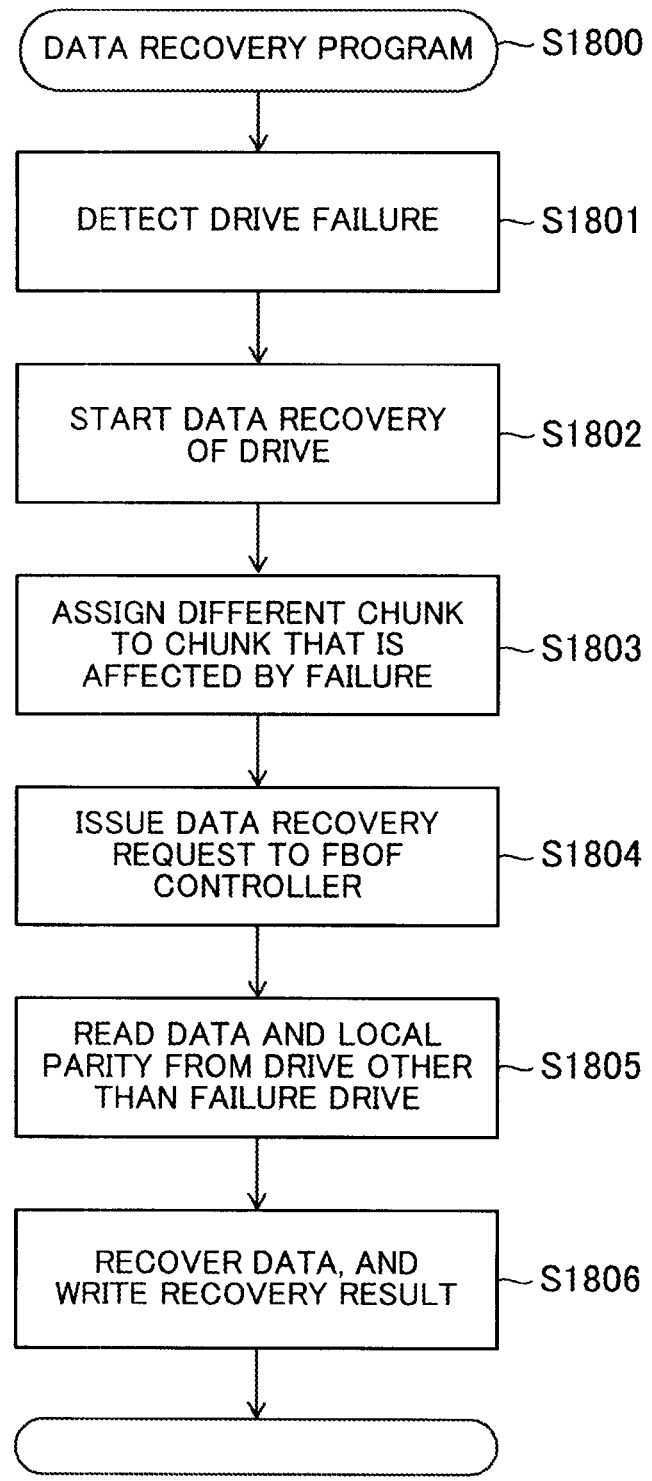
FIG. 19 is a configuration example of a data recovery program according to the second embodiment.

FIG. 19 is a configuration example of a data recovery (rebuild) program according to this embodiment. The data recovery program is a program that is executed by the storage controller when a drive failure has occurred and in which after the recovery of the data in the failure drive, the recovery data is written to the designated region.

First, any one of the storage controllers detects a failure in the drive in the FBOF (1801). After the fixed time, or according to the user instruction, the storage controller starts the data recovery of the drive in which the failure has occurred (1802). The storage controller assigns the different empty Chunk to the Chunk that is affected by the failure (1803). The storage controller repeatedly issues a data recovery request to the FBOF controller of the FBOF in which the failure drive is mounted, for each address of the Chunk with respect to the failure drive (1804). The data recovery request includes the set of the address information necessary for the data recovery, the write destination address of the recovery data, and the recovery method. The FBOF controller reads the designated data and local parity into the read buffer (1805), recovers the data by the designated method, and writes a recovery result to the designated region (1806).

Also in the process of the data recovery program, the data recovery by the FBOF controller is enabled like FIG. 18. Note that the data recovery by the storage controller is performed like FIG. 18 when the redundant data is distributed to the plural FBOFs. Also, the data recovery may be preformed by the storage controller according to the operation rate of the FBOF.

FIG. 20 is a configuration example of a recovery/no recovery changing program. The recovery/no recovery changing program is a program by which the recovery/no recovery determination by the FBOF controller, executed by the read programs 1200 and 1700 and the data recovery programs 1100 and 1600 is executed by other than the controller and the FBOF (for example, the management server 105), and is set to the FBOF.

First, the management server 105 periodically collects the CPU operation rate, the read buffer usage rate, the memory bandwidth usage rate, and the like of each FBOF (1901). Thereafter, it is determined, on the basis of the collected information, whether or not each FBOF is overloaded, thereby deciding whether the recovery is enabled or is not enabled (1902). For example, when the operation rate of the FBOF is less than the fixed rate, it is decided that the recovery is enabled, and when the operation rate of the FBOF is the fixed rate or more, it is decided that the recovery is not enabled. Last, the decided recovery/no recovery information is set to the FBOF (1903). The FBOF determines, on the basis of the set value, whether the recovery is enabled or not enabled.

Note that the recovery/no recovery determination can also be manually set by the user. In this case, the management server includes an interface to which the recovery/no recovery determination is manually inputted, and sets, to the FBOF, the user input value to the interface.

The method by which also in the configuration storing data in the plural FBOFs, when a failure has occurred in any one of the drives in the FBOFs, the storage controller and the FBOF controller are cooperated to perform the data recovery in the interior of the FBOF, thereby transferring only the data that becomes the recovery result, from the FBOF to the server has been illustrated above.

The embodiment of the present invention has been described above, but the present invention is not limited to the above embodiment. Those skilled in the art easily enable changing, addition, and conversion with respect to each element of the above embodiment in the scope of the present invention.

Parts or all of the above respective configurations, functions, processing units, processing means, and the like may be achieved by a hardware by the designing by, for example, an integrated circuit and the like. The information, such as the program, table, and file, achieving each function can be stored in a storage device, such as a non volatile semiconductor memory, a hard disk drive, and an SSD (Solid State Drive), or a non transitory calculator readable data storage medium, such as an IC card, an SD card, and a DVD.

As described above, the storage system of the disclosure includes one or more storage units (Drive Boxes 106), and a calculator (server 101, controller 2501) connected to the one or more storage units via the communication network (network 104).

Each of the one or more storage units has plural physical storage devices (drives 204) that physically store data, and the processor 201.

Also, the calculator has the controller that processes the data inputted to and outputted from the storage unit by the processor 201.

The storage system subjects the data to redundancy and stores the redundant data, and when a failure in which the data related to a read request cannot be read from one of the physical drives has occurred, reads the data from the readable physical drive, recovers the data related to the read request from the read data, and transmits the recovered data to the request source of the read request.

The process for recovering the data related to the read request from the read data can be selectively executed by the controller of the calculator and the processor of the storage unit.

In this way, enabled are two ways by which the redundant configuration is managed by the calculator to perform the recovery by the controller and the redundant configuration is managed by the calculator to perform the recovery by the storage unit, so that while the load of the storage unit can be suppressed, the network transfer amount can be reduced.

Specifically, when the controller of the calculator performs the data recovery process, the storage unit reads plural data pieces used for recovery from the plural physical storage devices to transmit the data to the calculator, and the controller recovers the data related to the read request from the plural transmitted data pieces.

On the other hand, when the processor of the storage unit performs the data recovery process, the storage unit reads plural data pieces used for recovery from the plural physical storage devices to recover the data related to the read request, and transmits the recovered data to the calculator.

In this way, when the controller of the calculator performs the data recovery process, the load of the storage unit can be suppressed, and when the processor of the storage unit performs the data recovery process, the network transfer amount can be reduced.

Also, upon receiving the read request for the physical storage device in which the failure has occurred, the controller of the calculator decides which of the controller of the calculator and the processor of the storage unit performs the data recovery process. The controller of the calculator transmits the decision to the storage unit together with the read request.

For this, the data recovery process by the controller of the calculator and the data recovery process by the processor of the storage unit can be changed according to the state.

Also, the redundancy includes both of first redundancy enabling the data recovery by data in one storage unit and second redundancy enabling the data recovery by data in the plural storage units, and the controller of the calculator decides by which of the first redundancy and the second redundancy the data recovery is performed, and which of the controller of the calculator and the processor of the storage unit performs the data recovery process.

By using the first redundancy by the local parity and the second redundancy by the global parity in this way, while the reliability can be increased, the read cost of the network at the time of the data recovery can be suppressed, and the system performance can be stabilized.

Also, when the data recovery is performed by the first redundancy, the controller of the calculator decides that the processor of the storage unit performs the data recovery process, and when the data recovery is performed by the second redundancy, the controller of the calculator decides that the controller of the calculator performs the data recovery process.

The controller of the calculator determines whether the data recovery is enabled by the first redundancy, and when the data recovery is enabled, the controller of the calculator decides that the processor of the storage unit performs the data recovery process by using the first redundancy, and when the data recovery is not enabled, the controller of the calculator decides that the controller of the calculator performs the data recovery process by using the second redundancy.

For this, the data recovery process by the controller of the calculator and the data recovery process by the processor of the storage unit can be changed according to the location of the data.

Also, upon receiving the read request for the physical storage device in which the failure has occurred, the storage unit decides, on the basis of the load state of the storage unit, which of the controller of the calculator and the processor of the storage unit performs the data recovery process.

For this, the data recovery process by the controller of the calculator and the data recovery process by the processor of the storage unit can be changed according to the load of the storage unit.

What is claimed is:

1. A storage system comprising:
   one or more storage units; and
   a calculator connected to the one or more storage units via a communication network,
   wherein each of the one or more storage units has plural physical storage devices that physically store data, and a processor,
   wherein the calculator has a controller that processes data inputted to and outputted from a storage unit of the one or more storage units by the processor,
   wherein the storage system subjects the data to redundancy and stores the redundant data, and when a failure in which the data related to a read request cannot be read from one of the physical storage devices has occurred, reads data from a readable physical storage device of the physical storage devices to provide read data, recovers the data related to the read request from the read data, and transmits the recovered data to a request source of the read request, and
   wherein a process for recovering the data related to the read request from the read data is configured to be selectively executed by the controller of the calculator and the processor of the storage unit.

2. The storage system according to claim 1,
   wherein, when the controller of the calculator performs the process for recovering, the storage unit reads plural data pieces used for recovery from the plural physical storage devices to transmit the data to the calculator, and the controller recovers the data related to the read request from the plural transmitted data pieces, and
   wherein, when the processor of the storage unit performs the process for recovering, the storage unit reads plural data pieces used for recovery from the plural physical storage devices to recover the data related to the read request, and transmits the recovered data to the calculator.

3. The storage system according to claim 2,
   wherein upon receiving the read request for the physical storage device in which the failure has occurred, the controller of the calculator decides which of the controller of the calculator and the processor of the storage unit performs the data recovery process, and
   wherein the controller of the calculator transmits the decision to the storage unit together with the read request.

4. The storage system according to claim 3,
   wherein the redundancy includes both of first redundancy enabling the data recovery by data in one storage unit and second redundancy enabling the data recovery by data in the plural storage units, and wherein the controller of the calculator decides by which of the first redundancy and the second redundancy the data recovery is performed, and which of the controller of the calculator and the processor of the storage unit performs the data recovery process.

5. The storage system according to claim 4,
wherein when the data recovery is performed by the first redundancy, the controller of the calculator decides that the processor of the storage unit performs the data recovery process, and when the data recovery is performed by the second redundancy, the controller of the calculator decides that the controller of the calculator performs the data recovery process.

6. The storage system according to claim 5,
wherein the controller of the calculator determines whether the data recovery is enabled by the first redundancy, and when the data recovery is enabled, the controller of the calculator decides that the processor of the storage unit performs the data recovery process by using the first redundancy, and when the data recovery is not enabled, the controller of the calculator decides that the controller of the calculator performs the data recovery process by using the second redundancy.

7. The storage system according to claim 2,
wherein upon receiving the read request for the physical storage device in which the failure has occurred, the storage unit decides, on a basis of a load state of the storage unit, which of the controller of the calculator and the processor of the storage unit performs the data recovery process.

8. The storage system according to claim 2,
wherein the redundancy includes both of first redundancy enabling the data recovery by data in one storage unit and second redundancy enabling the data recovery by data in the plural storage units,
wherein the controller of the calculator determines whether the data recovery is enabled by the first redundancy, and transmits a determination result thereof to the storage unit together with the read request,
wherein when the determination is that the data recovery is not enabled by the first redundancy, the controller of the calculator reads the data from the plural storage units, and recovers the data related to the read request by the second redundancy, and
wherein when the determination is that the data recovery is enabled by the first redundancy, the controller of the calculator transmits the read request to one storage unit, and the storage unit that receives the read request decides, on a basis of its own load state, whether the data related to the read request is recovered by using the first redundancy by itself, and transmits, to the calculator, either the plural read data pieces or the data related to the read request recovered by using the first redundancy by using the plural read data pieces.

9. A storage system control method in a storage system including one or more storage units and a calculator connected to the one or more storage units via a communication network,
wherein each of the one or more storage units has plural physical storage devices that physically store data, and a processor,
wherein the calculator has a controller that processes the data inputted to and outputted from a storage unit of the one or more storage units by the processor,
wherein the storage system includes:
a process for subjecting the data to redundancy and storing the redundant data;
a process for, when a failure in which the data related to a read request cannot be read from one of the physical storage devices has occurred, reading data from a readable physical storage device of the physical storage devices to provide read data;
a process for recovering the data related to the read request from the read data; and
a process for transmitting the recovered data to a request source of the read request, and
wherein a process for recovering the data related to the read request from the read data can be selectively executed by the controller of the calculator and the processor of the storage unit.

* * * * *